US012753377B2

(12) United States Patent
Huibregtse

(10) Patent No.: US 12,753,377 B2
(45) Date of Patent: Oct. 6, 2026

(54) CARBONATED ALCOHOLIC BEVERAGE

(71) Applicant: Heineken Supply Chain B.V., Zoeterwoude (NL)

(72) Inventor: Suzanna Huibregtse, Zoeterwoude (NL)

(73) Assignee: HEINEKEN SUPPLY CHAIN B.V., Zoeterwoude (NL)

( * ) Notice: Subject to any disclaimer, the term of this patent is extended or adjusted under 35 U.S.C. 154(b) by 594 days.

(21) Appl. No.: 17/837,901

(22) Filed: Jun. 10, 2022

(65) Prior Publication Data

US 2022/0298457 A1 Sep. 22, 2022

Related U.S. Application Data

(63) Continuation of application No. PCT/EP2020/081315, filed on Nov. 6, 2020.

(30) Foreign Application Priority Data

Dec. 12, 2019 (EP) .................................... 19215674

(51) Int. Cl.
*C12G 3/06* (2006.01)

(52) U.S. Cl.
CPC ..................................... *C12G 3/06* (2013.01)

(58) Field of Classification Search
CPC ....................................................... C12G 3/06
USPC ......................................................... 426/592
See application file for complete search history.

(56) References Cited

U.S. PATENT DOCUMENTS 5,384,135 A * 1/1995 Caluwaerts .............. C12G 3/08 426/493
2008/0248158 A1* 10/2008 Dorr ......................... C12C 5/00 426/16
2015/0017280 A1* 1/2015 Vanderhaegen ......... C12G 3/06 426/534

OTHER PUBLICATIONS

Ammari et al., "Batch stripping of flavour active compounds from beer: Effect of dry matter and ethanol on equilibrium and mass transfer in a packed column" Food and Bioproducts Processing, vol. 118, (2019) pp. 306-317.
Collin et al., "Relationships between the chemical composition and sensory evaluation of lager beers" Food Quality and Preference, vol. 5, No. 1-2 (1994), pp. 145-149.
Database GNPD [Online] Mintel; Apr. 11, 2017, anonymous: "Traditional Natural Beer", XP055698777, retrieved from www.gnpd.com Database accession No. 4740955 (2 pages).
Database GNPD [Online] Mintel; Jul. 14, 2017, anonymous: "Original Sparkling Apple Cider", XP055698761, retrieved from www.gnpd.com Database accession No. 4960091 (4 pages).
Database GNPD [Online] Mintel; May 22, 2018, anonymous: "Pilsner Beer", XP055698768, retrieved from www.gnpd.com Database accession No. 5688503 (4 pages).
Huckenbeck et al., "Begleitstoffmuster in Bieren aus dem Einzugsbereich Niederlande/Belgien" Journal of Forensic Medicine, 9(1-4), (1993), pp. 73-81.
International Search Report and Written Opinion issued for PCT Appl. Ser. No. PCT/EP2020/081315 dated Feb. 5, 2021 (13 pages).
Nogueira et al., "Separation and quantification of beer carbohydrates by high-performance liquid chromatography with evaporative light scattering detection" Journal of Chromatography, vol. 1065, No. 2, (2005), pp. 207-210.
Rosend et al., "The effects of apple variety, ripening stage, and yeast strain on the volatile composition of apple cider", Heliyon, vol. 5, (2019), 7 pages.
Brauindustrie, vol. 67, No. 1-12, 1982, pp. 138-141.
Brauindustrie, vol. 68, No. 13-24, 1983, pp. 1374-1379.
Brauindustrie, vol. 71, No. 1-12, 1986, pp. 304-313.
Moll, Manfred, "Beers & Coolers", Lavoisier, ISBN—1898298092, Jan. 1, 2000, pp. 276-325.

* cited by examiner

*Primary Examiner* — Nikki H. Dees
*Assistant Examiner* — Philip A Dubois
(74) *Attorney, Agent, or Firm* — Sunit Talapatra; Foley & Lardner LLP

(57) ABSTRACT

The present invention relates to a carbonated beverage containing:
- 900-988 mg/g water;
- 3-60 mg/g ethanol;
- 0.2-8 mg/g dissolved carbon dioxide;
- 0-4 mg/g protein;
- ethyl acetate in a concentration of 1-20 mg per gram of ethanol;
- isoamyl acetate in a concentration of 0.1-5 mg per gram of ethanol;
- $C_3$-$C_5$ alcohols in a concentration of 1.5-50 mg per gram of ethanol;

wherein ethyl acetate and isoamyl acetate are present in a weight ratio that is within the range of 2:1 to 30:1.

The carbonated beverage of the present invention combines a punchy taste with a pleasant fruity flavor.

The invention also provides a process of producing the aforementioned carbonated beverage, said process comprising:
- providing a yeast fermented liquid comprising at least 1.5% (v/v) ethanol and volatile flavour components;
- subjecting the yeast fermented liquid to a decarbonation step in which a gaseous component comprising carbon dioxide, ethanol and volatile flavour components is removed;
- contacting the gaseous component with an aqueous liquid to transfer at least a part of the ethanol and the volatile flavour components from the gaseous component to the aqueous liquid, thereby producing scrubber water;
- optionally diluting the scrubber water; and
- carbonating the optionally diluted scrubber water.

5 Claims, No Drawings

CARBONATED ALCOHOLIC BEVERAGE

CROSS-REFERENCE TO RELATED APPLICATIONS

The present application is a continuation application of PCT/EP2020/081315 filed Nov. 6, 2020, which claims priority to EP 19215674.3 filed Dec. 12, 2019 the entire contents of both which are incorporated herein by reference.

TECHNICAL FIELD OF THE INVENTION

The present invention relates to a carbonated alcoholic beverage that can be produced from a side stream of the production of alcohol-free yeast fermented beverage, more particularly from a side stream that is generated in a decarbonation step that is applied prior to de-alcoholisation of alcohol-containing beer.

The carbonated beverage according to the present invention contains:

- 900-988 mg/g water;
- 3-60 mg/g ethanol;
- 0.2-8 mg/g dissolved carbon dioxide;
- 0-4 mg/g protein;
- ethyl acetate in a concentration of 1-20 mg per gram of ethanol;
- isoamyl acetate in a concentration of 0.1-5 mg per gram of ethanol;
- $C_3$-$C_5$ alcohols in a concentration of 1.5-50 mg per gram of ethanol;

wherein ethyl acetate and isoamyl acetate are present in a weight ratio that is within the range of 2:1 to 30:1.

The carbonated beverage according to the present invention combines a punchy taste with a pleasant fruity flavor.

The invention also relate to a process of producing the aforementioned carbonated beverage, said process comprising:

- providing a yeast fermented liquid comprising at least 1.5% (v/v) ethanol and volatile flavour components;
- subjecting the yeast fermented liquid to a decarbonation step in which a gaseous component comprising carbon dioxide, ethanol and volatile flavour components is removed from the yeast fermented liquid;
- contacting the gaseous component comprising carbon dioxide, ethanol and volatile flavour components with an aqueous liquid to transfer at least a part of the ethanol and the volatile flavour components from the gaseous component to the aqueous liquid, thereby producing scrubber water;
- optionally diluting the scrubber water; and
- carbonating the optionally diluted scrubber water.

BACKGROUND OF THE INVENTION

Beer is a universally popular beverage, consumed worldwide. Beer is commonly produced by a process that comprises the following basic steps:

- mashing a mixture of grain and water to produce a mash;
- separating the mash in wort and spent grain;
- boiling the wort to stabilize and sterilize the wort and extract the bitterness from the hops;
- fermenting the boiled wort with live yeast to produce a young beer;
- subjecting the young beer to one or more further process steps (e.g. maturation and filtration) to produce beer; and
- packaging the beer in a sealed container, e.g. a bottle, can or keg.

In recent years, the beer market has witnessed a significant increase in the consumption of non-alcoholic beer.

Non-alcoholic beers are produced by two basis processes. One applies classical brewing processes followed by alcohol removal by techniques such as reverse osmosis, dialysis or evaporation. The other approach aims at avoiding or reducing the formation of alcohol during fermentation by contacting wort with live yeast under conditions that minimise fermentative production of alcohol.

U.S. Pat. No. 5,384,135 describes a process for the manufacture of an alcohol-free pale beer by dealcoholisation of an alcoholic pale beer by evaporation under high vacuum, wherein said dealcoholisation is carried out continuously and comprises:

- a decarbonation stage under a pressure of 0.06-0.1 bar, during which a portion of the ethanol and the flavour compounds are entrained by $CO_2$ and partially condensed and recovered;
- a distillation stage under a pressure of 0.06-0.1 bar at a temperature between 50° and 65° C., the flavour compounds condensed with the ethanolic phase being partially extracted and recovered.

US 2015/0017280 describes a method for producing an alcohol free or low alcohol fermented malt based beverage having an alcohol content of not more than 1.0 vol. %, said method comprising the following steps:

- (a) preparing a malt based beverage having an alcohol content of not more than 1.0 vol. % by vacuum evaporation, and wherein part of the vapour phase, excluding ethanol, is condensed;
- (b) measuring the contents of ethyl acetate and ethyl butyrate in the thus obtained beverage; and
- (c) adding at least part of the condensate to said beverage.

US 2015/017280 further describes a fermented malt based beverage having an alcohol content of not more than 1.0 vol. %, comprising:

- 7.00-30.00 ppm ethylacetate
- 0.01-0.20 ppm ethyl butyrate
- 0.05-2.00 ppm isoamyl acetate; and
- 0.01-0.05 ppm ethyl hexanoate.

Collin et al. (*Relationships between the chemical composition and sensory evaluation of lager beers*. Food Quality and Preference, vol. 5, No. 1-2 (1994), 145-149) report the average, maximum and minimum values of ester and dimethylsulphide content in 33 commercial lager beers.

Ammari et al. (*Batch stripping of flavour active compounds from beer*, Food and Bioproducts Processing, vol. 118, (2019, 306-317) investigated the effect of beer dry matter, a complex mixture of carbohydrates and proteins, and of ethanol on flavour behaviour during treatment with a packed bed column using $CO_2$ as a stripping agent. FIGS. B1 and B2 provide compositional information about some commercial beers.

SUMMARY OF THE INVENTION

The inventors have unexpectedly discovered that a carbonated alcoholic beverage having a very pleasant taste can be produced from the aqueous liquid that is obtained when the carbon dioxide stream that is generated during decarbonation of alcoholic beer is passed through water (scrubbing). The scrubber water so obtained contains ethanol and other organic volatiles, including lower alcohols, such as amyl alcohol and isobutanol, and aroma compounds such as ethyl acetate and isoamyl acetate.

The carbonated beverage of the present invention can be produced by carbonating the aforementioned scrubber water, of which water and ethanol are the main components, and optionally adding further ingredients such as water, sugars, fruit juice (concentrate) etc.

The carbonated beverage according to the present invention is characterized in that it contains:

- 900-988 mg/g water;
- 3-60 mg/g ethanol;
- 0.2-8 mg/g dissolved carbon dioxide;
- 0-4 mg/g protein;
- ethyl acetate in a concentration of 1-20 mg per gram of ethanol;
- isoamyl acetate in a concentration of 0.1-5 mg per gram of ethanol;
- $C_3$-$C_5$ alcohols in a concentration of 1.5-50 mg per gram of ethanol;

wherein ethyl acetate and isoamyl acetate are present in a weight ratio that is within the range of 2:1 to 30:1.

The carbonated beverage of the present invention combines a punchy taste with a pleasant fruity flavor. This pleasant taste is derived from the presence of the fruity esters ethyl acetate and isoamyl acetate in the specified concentrations and the presence of ethanol and $C_3$-$C_5$ alcohols. Also other aroma compounds present in the scrubber water are believed to contribute to the pleasant, complex flavour of the carbonated beverage.

The present invention also provides a process of producing the aforementioned carbonated beverage, said process comprising:

- providing a yeast fermented liquid comprising at least 1.5% (v/v) ethanol and volatile flavour components;
- subjecting the yeast fermented liquid to a decarbonation step in which a gaseous component comprising carbon dioxide, ethanol and volatile flavour components is removed from the yeast fermented liquid;
- contacting the gaseous component comprising carbon dioxide, ethanol and volatile flavour components with an aqueous liquid to transfer at least a part of the ethanol and the volatile flavour components from the gaseous component to the aqueous liquid, thereby producing scrubber water;
- optionally diluting the scrubber water; and
- carbonating the optionally diluted scrubber water.

Examples of yeast fermented liquids that can be employed in the present process include beer, cider and wine. Surprisingly, it was found that the composition of the scrubber water produced in the aforementioned method is hardly affected by the ratio in which the gaseous component is contacted with the aqueous liquid. Increasing this ratio was found to lead to comparable increases in the levels of ethanol and volatile flavour components in the scrubber water. In other words, if a high ratio of gaseous component to aqueous liquid is used, the scrubber water produced merely is a more concentrated version of the scrubber water that is obtained when a much lower ratio is used. This means that, in order to produce a carbonated beverage of constant quality, it is not necessary to carefully control the 'scrubbing' step of the present method as the scrubber water can be diluted to achieve a constant composition.

The invention also relates to the use of scrubber water that is obtained from decarbonation of a yeast fermented beverage in the preparation of a beverage containing 0-4 mg/g of starch hydrolysis components selected from maltose, maltotriose, maltotetraose and combinations thereof, said preparation comprising combining the scrubber water with one or more components selected from carbon dioxide, sweetener, food acid, fruit juice, fruit juice concentrate, essential oil and combinations thereof.

DETAILED DESCRIPTION OF THE INVENTION

A first aspect of the invention relates to a carbonated beverage containing:

- 900-988 mg/g water;
- 3-60 mg/g ethanol;
- 0.2-8 mg/g dissolved carbon dioxide;
- 0-4 mg/g protein;
- ethyl acetate in a concentration of 1-20 mg per gram of ethanol;
- isoamyl acetate in a concentration of 0.1-5 mg per gram of ethanol;
- $C_3$-$C_5$ alcohols in a concentration of 1.5-50 mg per gram of ethanol;

wherein ethyl acetate and isoamyl acetate are present in a weight ratio that is within the range of 2:1 to 30:1.

The term "isoamyl acetate" as used herein refers to 3-methyl-1-butyl ethanoate.

The term "protein" as used herein refers to a polymer that comprises a linear chain of at least 10 amino acid residues.

The term "decarbonation" as used herein refers to the removal of carbon dioxide from liquid. The scrubber water that is used in the preparation of the present carbonated beverages is essentially colourless. Preferably, no colouring is added in the preparation of the carbonated beverage. Accordingly, in a preferred embodiment, the beverage is colourless.

The scrubber water that is employed to prepare the carbonated beverage typically is a clear liquid. This clearness is preferably retained in the carbonated beverage by exclusively employing ingredients that fully dissolve. Thus, in a particularly preferred embodiment, the carbonated beverage of the present invention is a clear beverage.

Besides the scrubber water the carbonated beverage of the present invention may comprise other ingredients. Preferably, however, the beverage consists of optionally diluted scrubber water with no more than a minor amount of added ingredients. Accordingly, in a preferred embodiment, the combination of ethanol and water constitutes at least 95 wt. %, more preferably at least 97 wt. % and most preferably at least 98 wt. % of the carbonated beverage.

The carbonated beverage of the present invention can suitably be produced using scrubber water obtained by decarbonation of a yeast fermented malt beverage, e.g. beer. Beer typically contains hop acids that impart a desirable bitter taste. These hop acids are non-volatile and consequently the scrubber water does not contain such hop acids. Also it is preferred not to use hop acids in the preparation of the carbonated beverage. Accordingly, the carbonated beverage preferably contains 0-1 μg/g, more preferably 0-0.1 μg/g and most preferably 0-0.01 μg/g hop acids selected from α-acids, iso-α acids and combinations thereof.

Starch hydrolysis components are an example of another non-volatile component that is present in beer, but that preferably is either absent in the present carbonated beverage or that is present in a much lower concentration than in beer. Accordingly, in a preferred embodiment, the carbonated beverage contains not more than 4 mg/g, more preferably not more than 1 mg/g and most preferably not more than 0.2 mg/g of starch hydrolysis components selected from maltose, maltotriose, maltotetraose and combinations thereof.

The carbonated beverage of the present invention can also be produced from cider, e.g. apple cider. Cider typically contains malic acid in a concentration of between 4.5 to 7.5 g/L. Malic acid is non-volatile and consequently the scrubber water produced during decarbonation of cider contains no more than a very limited amount of malic acid. Malic is preferably not added to the carbonated beverage of the present invention. Accordingly, in a preferred embodiment, the carbonated beverage contains less than 3 mg/g, more preferably less than 1 mg/g and most preferably less than 0.5 mg/g of malic acid.

The water content of the carbonated beverage typically lies in the range of 920 to 985 mg/g, more preferably in the range of 940 to 982 mg/g and most preferably in the range of 950 to 980 mg/g Preferably, the ethanol content of the carbonated beverage is in the range of 5 to 50 mg/g, more preferably in the range of 8 to 45 mg/g and most preferably in the range of 15 to 40 mg/g.

The carbonated beverage of the present invention preferably is moderately carbonated. Accordingly, in a preferred embodiment, the beverage contains 0.3 to 6 mg/g dissolved carbon dioxide, more preferably 0.4 to 4 mg/g dissolved carbon dioxide.

The carbonated beverage of the present invention may suitably be packaged in a sealed container such as a bottle, a can or a cask. In one embodiment of the invention, the carbonated beverage is packaged in a glass bottle, a can or a cask and the carbonated beverage contains 0.2-5 mg/g dissolved carbon dioxide, preferably 0.3-4 mg/g dissolved carbon dioxide. In another embodiment, the carbonated beverage is packaged in a PET bottle and the carbonated beverage contains 3-8 mg/g dissolved carbon dioxide, preferably 4-7 mg/g dissolved carbon dioxide.

Protein is another component that is not present in the scrubber water because it is non-volatile. The carbonated beverage preferably contains 0-3 mg/g protein, more preferably 0-1 mg/g protein and most preferably 0-0.05 mg/g protein.

Ethyl acetate is preferably contained in the carbonated beverage in a concentration of 2-18 mg per gram of ethanol, more preferably in a concentration of 2.5-15 mg per gram of ethanol and most preferably in a concentration of 3-12 mg per gram of ethanol.

In one embodiment of the present invention the carbonated beverage is prepared from scrubber water that was obtained by decarbonation of beer. In accordance with this embodiment, isoamyl acetate is preferably contained in the carbonated beverage in a concentration of 0.4-4 mg per gram of ethanol, more preferably in a concentration of 0.5-3.5 mg per gram of ethanol and most preferably in a concentration of 0.6-3 mg per gram of ethanol.

In an alternative embodiment of the present invention the carbonated beverage is prepared from scrubber water that was obtained by decarbonation of cider, especially apple cider. In accordance with this embodiment, isoamyl acetate is preferably contained in the carbonated beverage in a concentration of 0.1-2 mg per gram of ethanol, more preferably in a concentration of 0.15-1.5 mg per gram of ethanol and most preferably in a concentration of 0.2-1 mg per gram of ethanol.

If the carbonated beverage is prepared from scrubber water from beer production, the $C_3$-$C_5$ alcohols are preferably contained in the carbonated beverage in a concentration of 2-12 mg per gram of ethanol, more preferably in a concentration of 2.5-11 mg per gram of ethanol and most preferably in a concentration of 3-10 mg per gram of ethanol.

If the carbonated beverage is prepared from scrubber water from cider production, the $C_3$-$C_5$ alcohols are preferably contained in the carbonated beverage in a concentration of 5-50 mg per gram of ethanol, more preferably in a concentration of 8-40 mg per gram of ethanol and most preferably in a concentration of 10-35 mg per gram of ethanol.

The ratio in which ethyl acetate and isoamyl acetate are present in the carbonated beverage has a clear impact on the flavour character of the beverage. In case the carbonated beverage is prepared from scrubber water from beer production, preferably, ethyl acetate and isoamyl acetate are present in a weight ratio that is within the range of 2.5:1 to 12:1, more preferably within the range of 3:1 to 10:1 and most preferably within the range of 3.5:1 to 9:1.

In case the carbonated beverage is prepared from scrubber water from cider production, preferably, ethyl acetate and isoamyl acetate are present in a weight ratio that is within the range of 5:1 to 30:1, more preferably within the range of 8:1 to 25:1 and most preferably within the range of 12:1 to 20:1.

In another preferred embodiment, amyl alcohols selected from 3-methylbutan-1-ol, 2-methylbutan-1-ol and combinations thereof are present in the carbonated beverage in a concentration of 1-50 mg per gram of ethanol. In case the carbonated beverage is prepared from scrubber water from beer production, these amyl alcohols are preferably present in the beverage in a concentration of 1-15 mg per gram of ethanol, more preferably in a concentration of 1.5-12 mg per gram of ethanol, most preferably in a concentration of 2-10 mg per gram of ethanol.

In case the carbonated beverage is prepared from scrubber water from cider production, amyl alcohols selected from 3-methylbutan-1-ol, 2-methylbutan-1-ol and combinations thereof, are preferably present in the carbonated beverage in a concentration of 5-50 mg per gram of ethanol, more preferably in a concentration of 7-40 mg per gram of ethanol and most preferably in a concentration of 8-30 mg per gram of ethanol.

In accordance with another advantageous embodiment, the carbonated beverage contains not more than a limited amount of polysaccharides. Preferably, the beverage contains 0-10 mg/g, more preferably 0-3 mg/g and most preferably 0-1 mg/g polysaccharides. Here the term "polysaccharide" refers to a polymeric carbohydrate comprising at least 10 monosaccharide units.

Sweeteners such as sucrose, glucose and/or fructose may be present in the carbonated beverage. Preferably, the beverage contains 0-30 mg/g, even more preferably 1-15 mg/g and most preferably 2-10 mg/g of saccharides selected from monosaccharides, disaccharides and combinations thereof.

Besides ethyl acetate and isoamyl acetate, the carbonated beverage typically contains a number of other volatile compounds that are naturally present in yeast fermented beverages. Examples of such compounds include acetaldehyde, dimethyl sulphide, ethyl carpronate, 3-methylbutan-1-ol, 2-methylbutan-1-ol and isobutanol.

In one preferred embodiment, the beverage contains acetaldehyde in a concentration of 0.1-5 mg per gram of ethanol, more preferably in a concentration of 0.2-4 mg per gram of ethanol and most preferably in a concentration of 0.3-3 mg per gram of ethanol.

The aroma compound dimethyl sulphide is preferably contained in the carbonated beverage in a concentration of 1-20 pg per gram of ethanol, more preferably in a concentration of 2-15 μg per gram of ethanol and most preferably in a concentration of 2.5-10 μg per gram of ethanol.

Ethyl capronate is preferably present in the carbonated beverage in a concentration of 15-200 μg per gram of ethanol, more preferably in a concentration of 20-180 μg per gram of ethanol and most preferably in a concentration of 25-150 μg per gram of ethanol.

In another preferred embodiment, the carbonated beverage contains isobutanol in a concentration of 0.2-5 mg per gram of ethanol. More preferably isobutanol is present in the beverage in a concentration of 0.3-4 mg per gram of ethanol, most preferably in a concentration of 0.4-3 mg per gram of ethanol The carbonated beverage of the present invention typically has a pH in the range of 3 to 7, more preferably a pH in the range of 4 to 6.5 and most preferably pH in the range of 4.5 to 6.0.

According to a preferred embodiment, the carbonated beverage does not contain added flavouring.

In a further preferred embodiment, the carbonated beverage does not contain added colouring. Even more preferably, the carbonated beverage is colourless.

The carbonated beverage of the present invention is preferably obtained by process as described herein below.

Another aspect of the present invention relates to a process of producing the carbonated beverage of the present invention, said process comprising:

- providing a yeast fermented liquid comprising at least 1.5% (v/v) ethanol and volatile flavour components;
- subjecting the yeast fermented liquid to a decarbonation step in which a gaseous component comprising carbon dioxide, ethanol and volatile flavour components is removed from the yeast fermented liquid;
- contacting the gaseous component comprising carbon dioxide, ethanol and volatile flavour components with an aqueous liquid to transfer at least a part of the ethanol and the volatile flavour components from the gaseous component to the aqueous liquid, thereby producing scrubber water;
- optionally diluting the scrubber water; and
- carbonating the optionally diluted scrubber water.

The yeast fermented beverage that is employed in the present process preferably is beer or cider. Most preferably, the yeast fermented beverage is a beer, most preferably a lager beer.

The decarbonation step is preferably carried out at a pressure of 20-400 mbar, more preferably at a pressure of 40-300 mbar and most preferably at a pressure of 50-200 mbar.

The yeast fermented beverage preferably has a temperature in the range of 10-80° C., more preferably in the range of 20-70° C. and most preferably in the range of 30-55° C., when it is subjected to the decarbonation step.

The gaseous component that is removed from the yeast fermented liquid typically contains at least 50 vol. %, more preferably at least 80 vol. % carbon dioxide.

The aqueous liquid with which the gaseous component is contacted preferably contains at least 99 wt. % water, more preferably at least 99.5 wt. % water when it is first contacted with the gaseous component.

The gaseous component is preferably contacted with aqueous liquid having a temperature in the range of 1-60° C., more preferably a temperature in the range of 2-40° C. and most preferably a temperature in the range of 4-30° C.

The contacting of the gaseous component and the aqueous liquid is preferably continued until the scrubber water contains at least 5 mg/g ethanol. More preferably said contacting is continued until the scrubber water contains at least 10 mg/g ethanol, most preferably 20-100 mg/g ethanol.

In the present process, following the decarbonation step, the decarbonated liquid is typically subjected to a de-alcoholisation step that comprises evaporation, preferably vacuum evaporation. The de-alcoholisation step typically reduced the ethanol content to less than 1% (v/v).

In a preferred embodiment of the present process, 1 part by weight of the scrubber water is diluted with 1 to 20 parts by weight of water. More preferably, 1 part by weight of the scrubber water is diluted with 2 to 12 parts by weight of water, most preferably with 3 to 10 parts by weight of water.

Yet another aspect of the present invention relates to the use of scrubber water obtained by decarbonation of a yeast fermented beverage in the preparation of a beverage containing 0-4 mg/g of starch hydrolysis components selected from maltose, maltotriose, maltotetraose and combinations thereof, said preparation comprising combining the scrubber water with one or more components selected from carbon dioxide, sweetener, food acid, fruit juice, fruit juice concentrate, essential oil and combinations thereof, wherein the scrubber water contains:

- 890-990 mg/g water;
- 5-100 mg/g ethanol;
- 0-0.1 mg/g non-volatile components selected from monosaccharides, disaccharides, oligosaccharides, polysaccharides, amino acids, dipeptides, oligopeptides, polypeptides and combinations thereof;
- ethyl acetate in a concentration of 1-20 mg per gram of ethanol;
- isoamyl acetate in a concentration of 0.1-5 mg per gram of ethanol;
- $C_3$-$C_5$ alcohols in a concentration of 1.5-50 mg per gram of ethanol;

wherein ethyl acetate and isoamyl acetate are present in a weight ratio that is within the range of 2:1 to 30:1.

The water content of the scrubber water typically lies in the range of 900 to 985 mg/g, more preferably in the range of 905 to 982 mg/g and most preferably in the range of 910 to 980 mg/g.

Preferably, the ethanol content of the scrubber water is in the range of 5 to 110 mg/g, more preferably in the range of 10-100 mg/g and most preferably in the range of 20 to 90 mg/g.

The scrubber water preferably contains 0-0.05 mg/g protein, most preferably 0-0.01 mg/g protein.

Ethyl acetate is preferably contained in the scrubber water in a concentration of 2-18 mg per gram of ethanol, more preferably in a concentration of 2.5-15 mg per gram of ethanol and most preferably in a concentration of 3-12 mg per gram of ethanol.

If the scrubber water is obtained from the production of beer, isoamyl acetate is preferably contained in the scrubber water in a concentration of 0.4-4 mg per gram of ethanol, more preferably in a concentration of 0.5-3.5 mg per gram of ethanol and most preferably in a concentration of 0.6-3 mg per gram of ethanol.

If the scrubber water is obtained from the production of cider, isoamyl acetate is preferably contained in the scrubber water in a concentration of 0.1-2 mg per gram of ethanol, more preferably in a concentration of 0.15-1.5 mg per gram of ethanol and most preferably in a concentration of 0.2-1 mg per gram of ethanol.

If the scrubber water is obtained from the production of beer, the $C_3$-$C_5$ alcohols are preferably contained in the scrubber water in a concentration of 2-12 mg per gram of ethanol, more preferably in a concentration of 2.5-11 mg per gram of ethanol and most preferably in a concentration of 3-10 mg per gram of ethanol.

If the scrubber water is obtained from the production of cider, the $C_3$-$C_5$ alcohols are preferably contained in the scrubber water in a concentration of 5-50 mg per gram of ethanol, more preferably in a concentration of 8-40 mg per gram of ethanol and most preferably in a concentration of 10-35 mg per gram of ethanol.

If the scrubber water is obtained from the production of beer, ethyl acetate and isoamyl acetate are preferably present in the scrubber water in a weight ratio that is within the range of 2.5:1 to 12:1, more preferably within the range of 3:1 to 10:1 and most preferably within the range of 3.5:1 to 9:1.

If the scrubber water is obtained from the production of cider, ethyl acetate and isoamyl acetate are preferably present in the scrubber water in a weight ratio that is within the range of 5:1 to 30:1, more preferably within the range of 8:1 to 25:1 and most preferably within the range of 12:1 to 20:1.

In another preferred embodiment, amyl alcohols are present in the scrubber water in a concentration of 1-50 mg per gram of ethanol, said amyl alcohols being selected from 3-methylbutan-1-ol, 2-methylbutan-1-ol and combinations thereof. If the scrubber water is obtained from the production of beer, preferably, the aforementioned amyl alcohols are present in the scrubber water in a concentration of 1-15 mg per gram of ethanol, more preferably in a concentration of 1.5-12 mg per gram of ethanol, most preferably in a concentration of 2-10 mg per gram of ethanol.

If the scrubber water is obtained from the production of cider, the aforementioned amyl alcohols are preferably present in the scrubber water in a concentration of 5-50 mg per gram of ethanol, more preferably in a concentration of 7-40 mg per gram of ethanol, most preferably in a concentration of 8-30 mg per gram of ethanol.

Besides ethyl acetate and isoamyl acetate, the scrubber water typically contains a number of other volatile compounds that are naturally present in yeast fermented beverages. Examples of such compounds include acetaldehyde, dimethyl sulphide, 3-methylbutan-1-ol, 2-methylbutan-1-ol and isobutanol.

In one preferred embodiment, the scrubber water contains acetaldehyde in a concentration of 0.1-5 mg per gram of ethanol, more preferably in a concentration of 0.2-5 mg per gram of ethanol and most preferably in a concentration of 0.3-3 mg per gram of ethanol.

The aroma compound dimethyl sulphide is preferably contained in the scrubber water in a concentration of 1-20 μg per gram of ethanol, more preferably in a concentration of 2-15 μg per gram of ethanol and most preferably in a concentration of 2.5-10 μg per gram of ethanol.

Ethyl capronate is preferably present in the scrubber water in a concentration of 15-200 μg per gram of ethanol, more preferably in a concentration of 20-180 μg per gram of ethanol and most preferably in a concentration of 25-150 μg per gram of ethanol.

In another preferred embodiment, the scrubbing water contains isobutanol in a concentration of 0.2-5 mg per gram of ethanol. More preferably isobutanol is present in the beverage in a concentration of 0.3-4 mg per gram of ethanol, most preferably in a concentration of 0.4-3 mg per gram of ethanol The scrubber water of the present invention typically has a pH in the range of 5 to 8, more preferably a pH in the range of 5.2 to 7.5 and most preferably pH in the range of 5.5 to 7.2.

According to a particularly preferred embodiment, the use of the scrubber water comprises combining the scrubber water with carbon dioxide to produce a carbonated beverage.

The invention is further illustrated by the following non-limiting examples.

EXAMPLES

Example 1

An alcohol-free beer was produced on factory scale by dealcoholizing a lager beer having an alcohol content of 5 vol. %. The lager was decarbonated at a pressure of 100 mbar and a temperature of 43° C. before being subjected to de-alcoholisation by vacuum evaporation. The carbon dioxide stream generated during carbonisation was passed through a scrubber column filled with tap water.

During a period of 5 months, at regular intervals, samples were taken from the scrubber water after the scrubbing operation had been discontinued. The samples were stored in sealed containers before they were analysed by GC-MS. The results of the analyses are shown in Table 1.

TABLE 1

| | 1 | 2 | 3 | 4 | 5 |
|---|---|---|---|---|---|
| Ethanol (mg/g) | 29.2 | 27.2 | 71.9 | 27.5 | 56.3 |
| Acetaldehyde (mg/g ethanol) | 1.2 | 1.5 | 1.1 | 1.6 | 0.9 |
| Dimethyl sulphide (μg/g ethanol) | 9.5 | 8.6 | 3.1 | 7.5 | 3.4 |
| Ethyl acetate (mg/g ethanol) | 7.9 | 9.2 | 3.7 | 7.4 | 5.0 |
| Isobutanol (mg/g ethanol) | 0.7 | 0.7 | 0.5 | 0.7 | 0.5 |
| Isoamyl acetate (mg/g ethanol) | 1.5 | 1.5 | 0.6 | 1.5 | 0.8 |
| Ethyl capronate (μg/g ethanol) | 68.5 | 73.5 | 27.8 | 72.7 | 35.5 |
| Amyl alcohols (mg/g ethanol) | 3.2 | 2.9 | 1.9 | 2.9 | 2.0 |
| $C_3$-$C_5$ alcohols (mg/g ethanol) | 4.1 | 3.9 | 2.5 | 3.9 | 2.6 |
| Ethyl acetate:isoamyl acetate (w/w) | 5.3 | 6.0 | 6.0 | 5.1 | 6.0 |

Example 2

A commercially available wheat beer with an alcohol content of 5.0 vol. % was decarbonized using the same conditions as described in Example 1. A sample was taken from the scrubber water and analysed by GC-MS. The results are shown in Table 2.

TABLE 2

| | |
|---|---|
| Ethanol (mg/g) | 24.8 |
| Ethylacetate (mg/g ethanol) | 11.6 |
| Isobutanol (mg/g ethanol) | 4.5 |
| Isoamylacetate (mg/g ethanol) | 2.0 |
| Amyl alcohols (mg/g ethanol) | 6.0 |
| $C_3$-$C_5$ alcohols (mg/g ethanol) | 11.2 |
| Ethyl acetate:isoamyl acetate (w/w) | 5.2 |

Example 3

A commercially available abbey beer (Triple) with an alcohol content of 9 vol. % was decarbonized using the same conditions as described in Example 1. A sample was taken from the scrubber water and analysed by GC-MS. The results are shown in Table 3.

TABLE 3

| | |
|---|---|
| Ethanol (mg/g) | 10 |
| Ethylacetate (mg/g ethanol) | 18.2 |

TABLE 3-continued

| | |
|---|---|
| Isobutanol (mg/g ethanol) | n.a. |
| Isoamylacetate (mg/g ethanol) | 1.9 |
| Amyl alcohols (mg/g ethanol) | 5.5 |
| $C_3$-$C_5$ alcohols (mg/g ethanol) | 7.0 |
| Ethyl acetate:isoamyl acetate (w/w) | 9.4 |

Example 4

A commercially available apple cider with an alcohol content of 4.5 vol. % was decarbonized using the same conditions as described in Example 1. A sample was taken from the scrubber water and analysed by GC-MS. The results are shown in Table 4.

TABLE 4

| | |
|---|---|
| Ethanol (mg/g) | 55.4 |
| Ethylacetate (mg/g ethanol) | 3.9 |
| Isobutanol (mg/g ethanol) | 2.5 |
| Isoamylacetate (mg/g ethanol) | 0.27 |
| Amyl alcohols (mg/g ethanol) | 15.6 |
| $C_3$-$C_5$ alcohols (mg/g ethanol) | 22.8 |
| Ethyl acetate:isoamyl acetate (w/w) | 14.6 |

Example 5

A carbonated beverage according to the invention was prepared by diluting 1 part by weight of the scrubber water of Example 1 with 6 parts by weight of spring water, followed by carbonation to a $CO_2$ level of approximately 0.5 mg/g dissolved carbon dioxide and filling into glass bottles. The beverage so obtained was found to have punchy a very pleasant punchy taste with fruity notes.

The invention claimed is:

1. A process of producing a carbonated beverage comprising 900-988 mg/g water, 15-60 mg/g ethanol, 0.2-8 mg/g dissolved carbon dioxide, and 0-1 µg/g hop acids selected from α-acids, iso-α acids and combinations thereof, the process comprising:

(a) providing a yeast fermented liquid comprising at least 1.5% (v/v) ethanol and volatile flavour components;

(b) subjecting the yeast fermented liquid to a decarbonation step in which a gaseous component comprising carbon dioxide, ethanol and volatile flavour components is removed from the yeast fermented liquid;

(c) contacting the gaseous component comprising carbon dioxide, ethanol and volatile flavour components with an aqueous liquid to transfer at least a part of the ethanol and the volatile flavour components from the gaseous component to the aqueous liquid, thereby producing scrubber water comprising at least 5 mg/g of ethanol;

(d) combining 1 part by weight of the scrubber water with 1 to 20 parts by weight of water, and further with carbon dioxide and one or more components selected from sweetener, food acid, fruit juice, fruit juice concentrate, essential oil and combinations thereof to produce a carbonated beverage.

2. The process according to claim 1, wherein the decarbonation step is carried out at a pressure of 20-400 mbar.

3. The process according to claim 1, wherein the yeast fermented beverage has a temperature in the range of 10-80° C. when it is subjected to the decarbonation step.

4. The process according to claim 1, wherein the yeast fermented beverage is beer or cider.

5. A method of preparing a carbonated beverage comprising 5-50 mg/g ethanol, 0-4 mg/g of starch hydrolysis components selected from maltose, maltotriose, maltotetraose and combinations thereof, and 0-1 µg/g hop acids selected from α-acids, iso-α acids and combinations thereof, the method comprising combining 1 part by weight of scrubber water, obtained by decarbonation of a yeast fermented beverage with carbon dioxide, with 1 to 20 parts by weight of water, and further with carbon dioxide and one or more components selected from sweetener, food acid, fruit juice, fruit juice concentrate, essential oil and combinations thereof to produce a carbonated beverage, wherein the scrubber water comprises:

(a) 890-990 mg/g water;

(b) 5-100 mg/g ethanol;

(c) 0-0.1 mg/g non-volatile components selected from monosaccharides, disaccharides, oligosaccharides, polysaccharides, amino acids, dipeptides, oligopeptides, polypeptides and combinations thereof;

(d) ethyl acetate in a concentration of 1-20 mg per gram of ethanol;

(e) isoamyl acetate in a concentration of 0.1-5 mg per gram of ethanol;

(f) $C_3$-$C_5$ alcohols in a concentration of 1.5-50 mg per gram of ethanol;

wherein ethyl acetate and isoamyl acetate are present in a weight ratio that is within the range of 2:1 to 30:1.

* * * * *